Dec. 8, 1931. L. OLDFIELD 1,835,609
AUTOMOBILE PACKAGE CAR
Filed Nov. 14, 1927 5 Sheets-Sheet 1

Inventor:
Lee Oldfield.
by: Charles Allen
Attys.

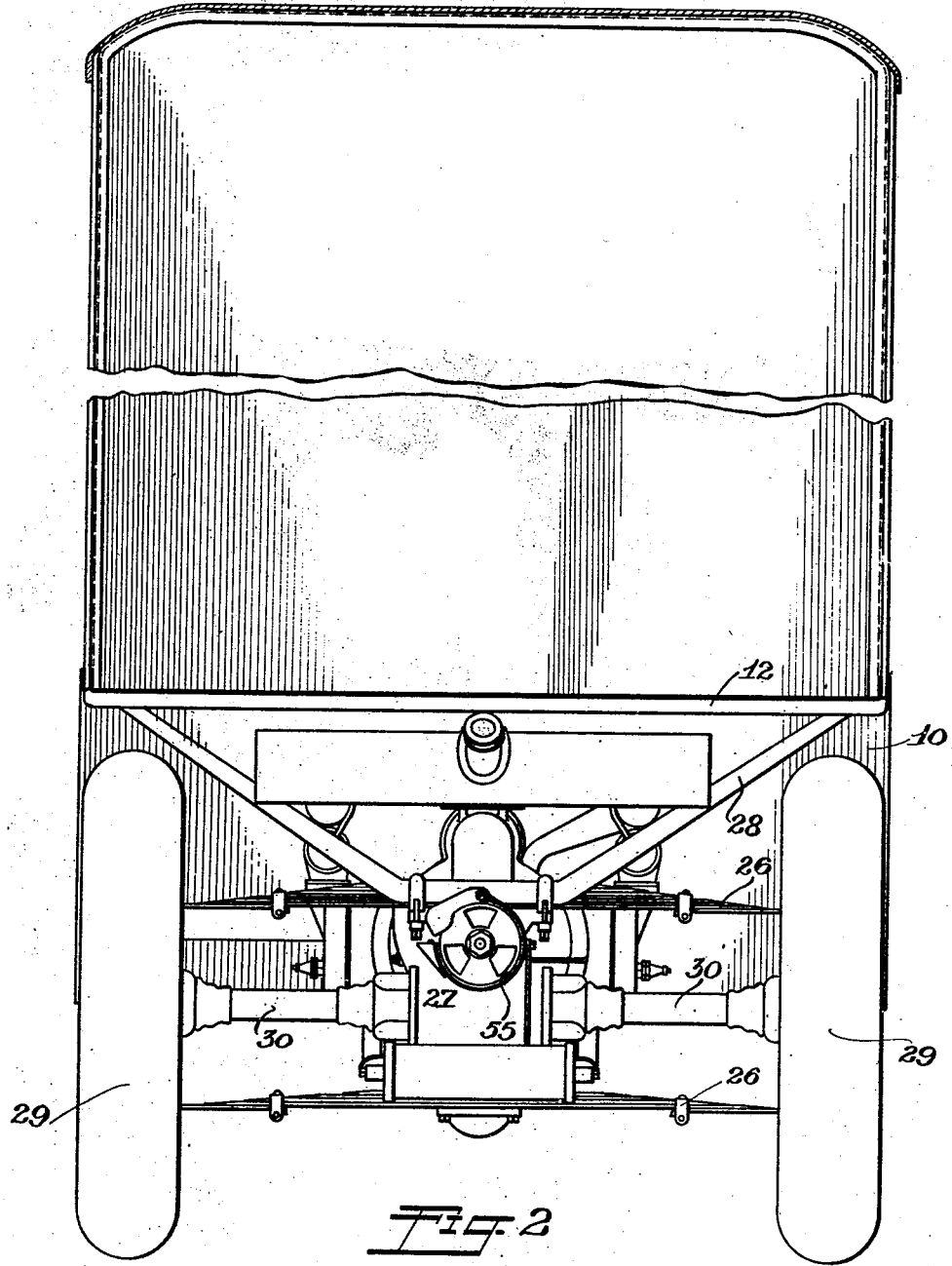

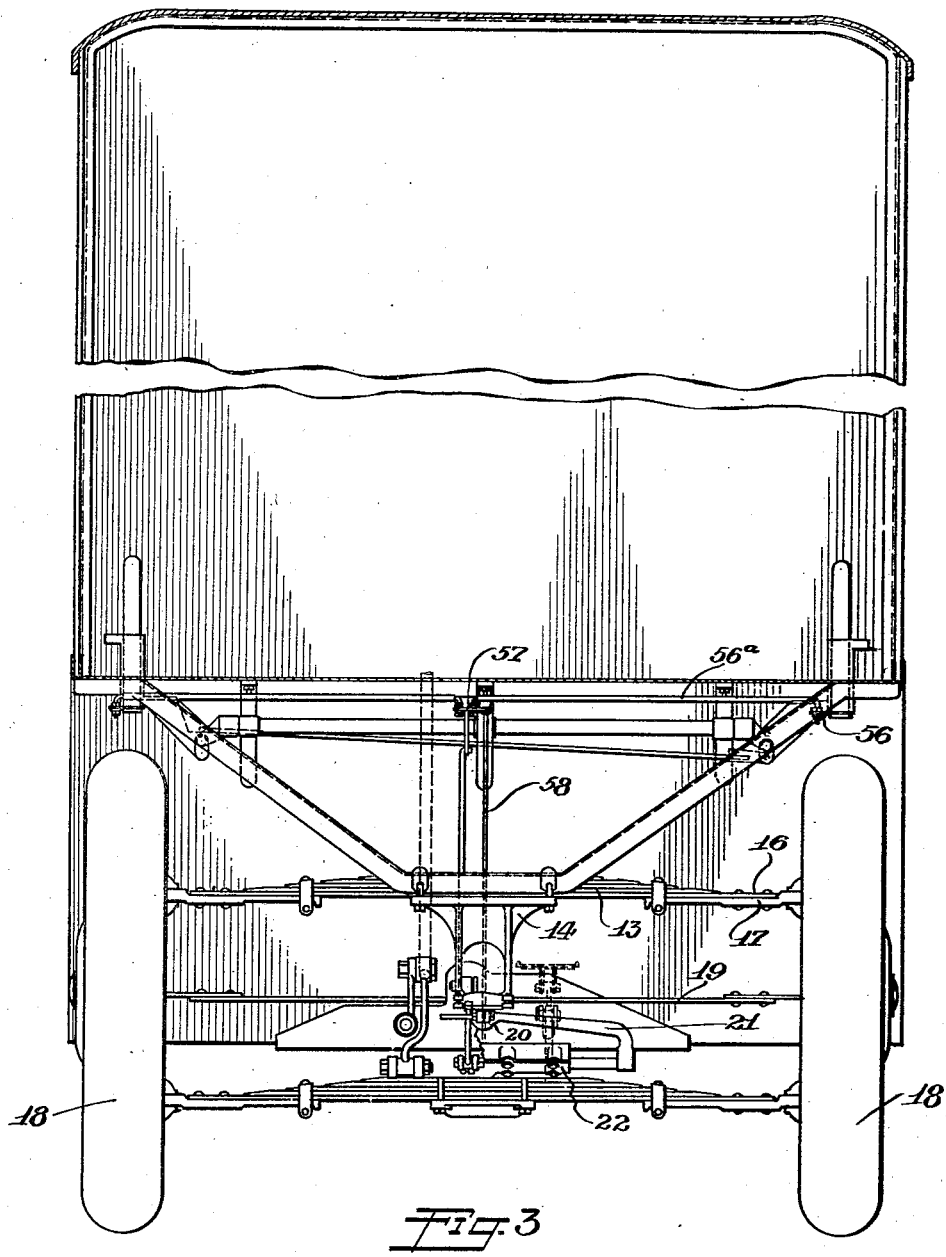

Dec. 8, 1931.    L. OLDFIELD    1,835,609
AUTOMOBILE PACKAGE CAR
Filed Nov. 14, 1927    5 Sheets-Sheet 4.
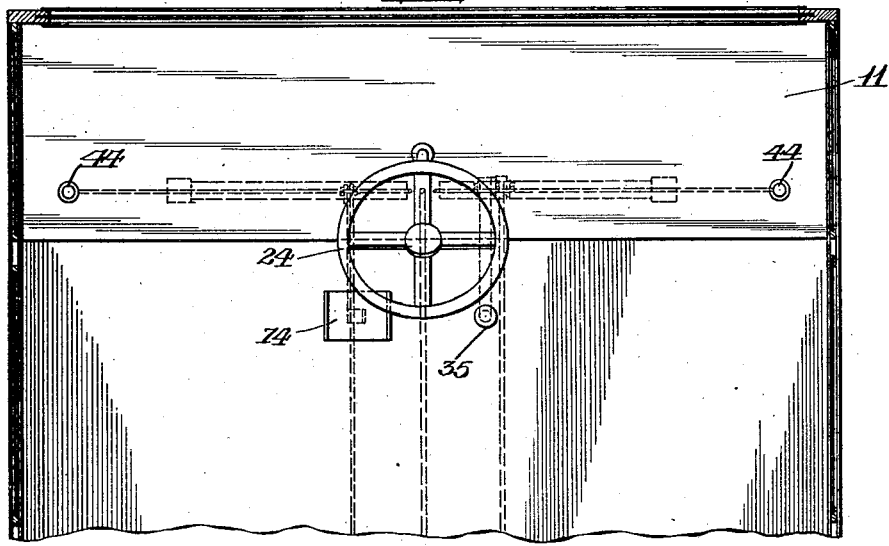
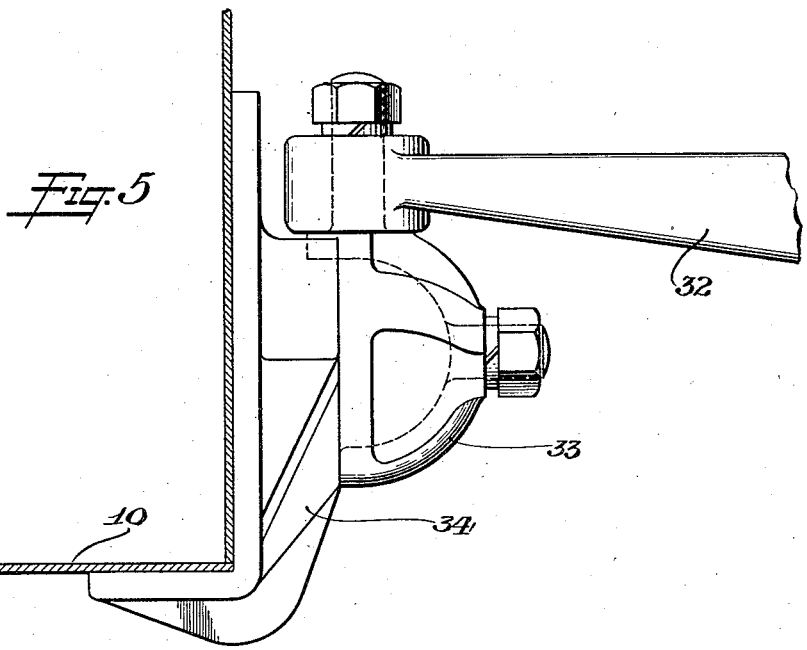
Inventor:
Lee Oldfield
by: Charles Wells
Attys.

Dec. 8, 1931.  L. OLDFIELD  1,835,609
AUTOMOBILE PACKAGE CAR
Filed Nov. 14, 1927   5 Sheets-Sheet 5
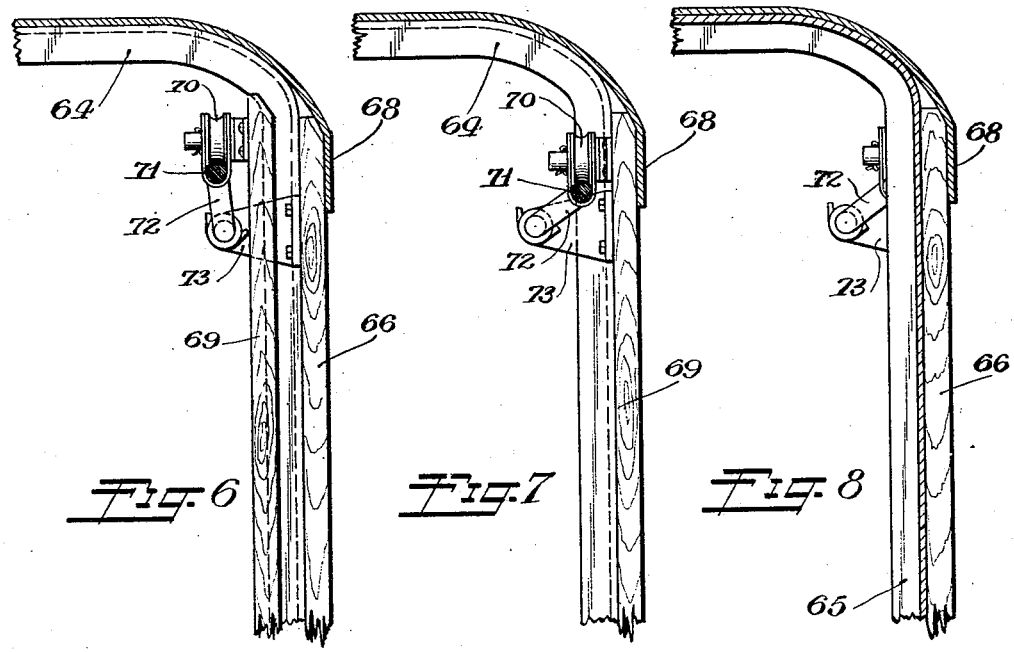
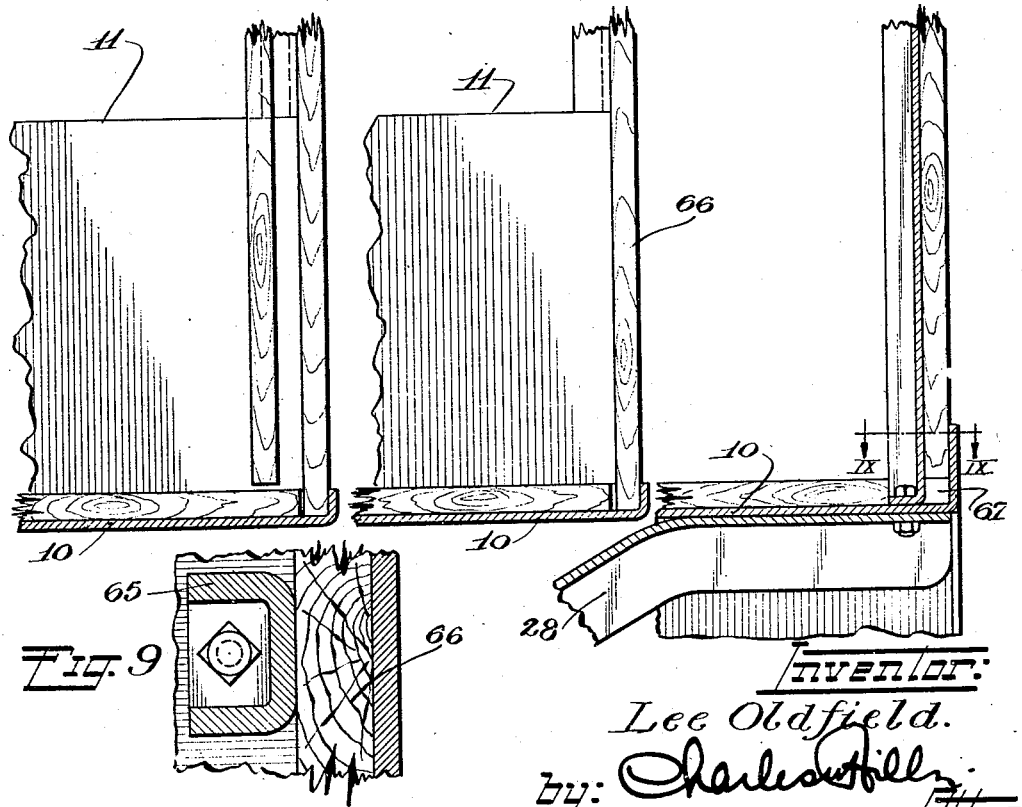
Inventor:
Lee Oldfield.
by: Charles Hill
Attys Patented Dec. 8, 1931

1,835,609

UNITED STATES PATENT OFFICE

LEE OLDFIELD, OF CHICAGO, ILLINOIS

AUTOMOBILE PACKAGE CAR

Application filed November 14, 1927. Serial No. 232,972.

This invention relates to automotive vehicle bodies of the commercial type, with special reference to vehicles particularly suited for house to house or package delivery whereain a light weight, economical and easily controlled vehicle is desirable.

It is an object of this invention to provide an improved vehicle of the type described wherein the body is mounted directly upon axle units without the interposition of a separate chassis frame connecting the axles; the body being constructed as a truss wherein the roof takes the major bending and compressive strains. Such a structure permits either axle unit to be removed without disturbing the other and the removal of the body leaves both axles separated with a corresponding ease of adjustment and repair.

It is also an object of this invention to provide an improved body framework or truss to which can be applied interchangeable panels forming an enclosure therefor, together with sliding doors having a shiftable mounting adapted to seat the doors flush with the panels, thus eliminating the customary door pockets in the interior of the body.

Other and further important objects of this invention will be apparent from the disclosures in the specification and the accompanying drawings.

This invention (in a preferred form) is illustrated in the drawings and hereinafter more fully described.

On the drawings:

Figure 2 is a rear elevation of the vehicle.

Figure 3 is a front elevation thereof, with the front enclosure of the body proper omitted.

Figure 4 is a section on the line IV—IV of Figure 1.

Figure 5 is an enlarged fragmentary detail of the front motor support or torque arm mounting.

Figure 6 is an enlarged vertical section on the line VI—VI of Figure 1 showing the door ready to be open.

Figure 7 is a section similar to Figure 6 showing the door seated flush with the side panels.

Figure 8 is a section on the line VIII—VIII of Figure 1 showing the mounting of the side panels.

Figure 9 is a fragmentary detail section on the line IX—IX of Figure 8.

As shown on the drawings:

Figure 1:
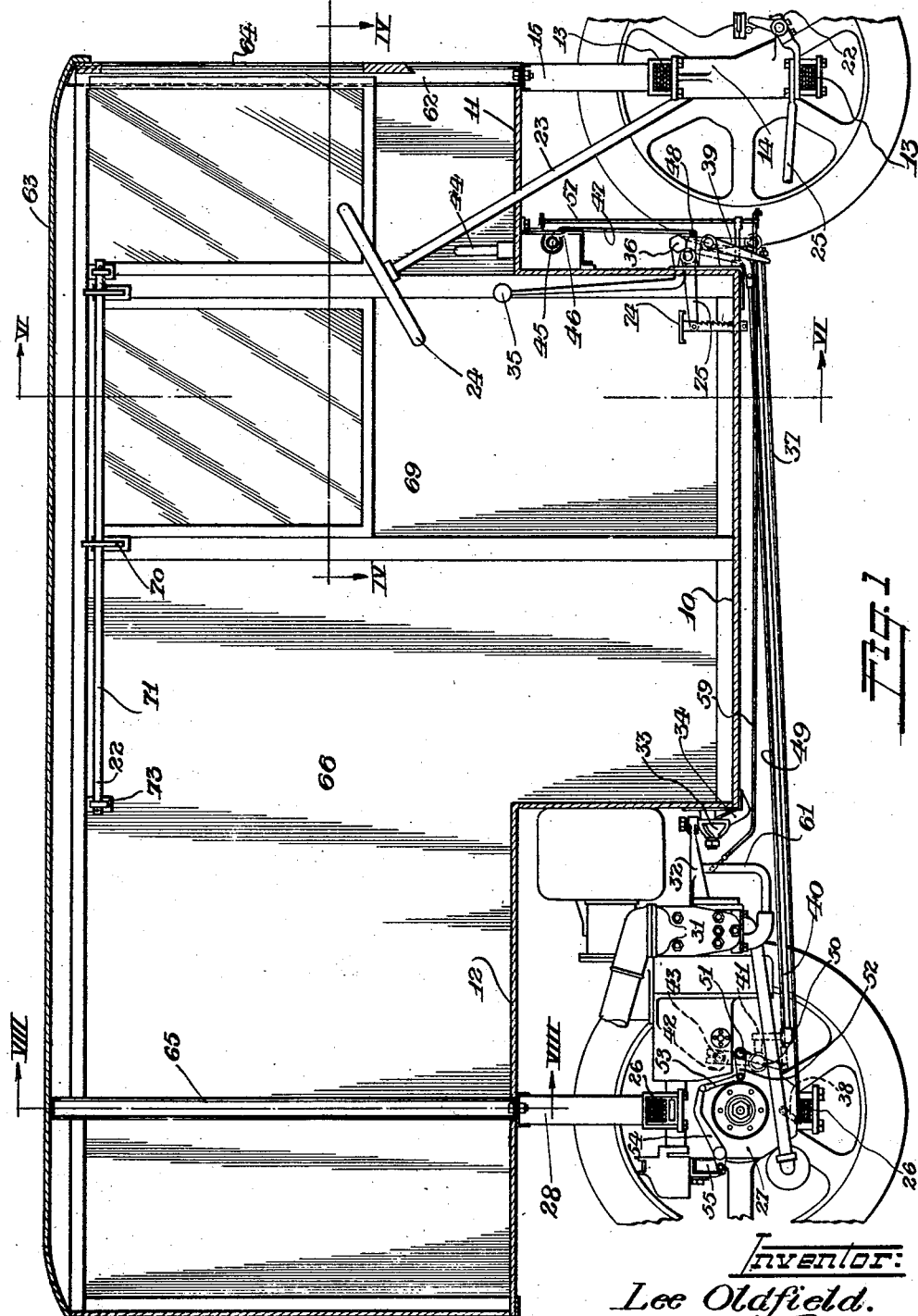
Figure 1 is a central longitudinal vertical section through a vehicle body embodying the features of this invention.

The vehicle body illustrated comprises a floor having a drop center section 10 and front and rear extensions 11 and 12 which are mounted over the front and rear axles. The front axle comprises parallel springs 13 mounted on a central spacer member 14 which is bolted to the center of a bracket 15 extending to the side edges of the front floor extension 11, the spring ends 16 being clamped and riveted to pivot arms 17 between which the wheel spindles and steering knuckles are pivoted. The front wheels 18 are connected by a spring tie bar 19 which has a central ball joint connection 20 to an arm 21 operated by a rack and pinion mechanism in the casing 22 shown in Figures 1 and 3, a steering post 23 extending upwardly to a steering wheel 24 within the body. The centrally connected spring tie bar has the same radius as the axle springs and will of course be deflected to the same extent by wheel movement so that the steering will not be affected by an up and down movement of the wheels. The lower end of the spacer member 14 is braced by a radius or brace rod 25 extending therefrom to the drop center portion of the vehicle floor.

The rear axle unit is similarly formed and supported, the parallel springs 26 being mounted on a transmission housing 27 which forms the central spacer member which is bolted to a bracket 28 in the same manner as with the front axle. In this case however the rear wheels 29 are not steerable, being driven by universally jointed shafts 30 extending from either side of the housing. A unit power plant 31, of the horizontal opposed cylinder type, forms a continuation of the transmission housing, and the forward end of the engine is supported by a torque arm 32 bolted to a socket 33 which is pivoted on a bracket 34 which is in turn secured to the rear edge of the drop center floor section. This socket 33 is formed as a duplicate of the pivot of the arms 17.

The vehicle controls comprise a centrally mounted gear shift lever 35 pivoted at 36 to operate a shifter rod 37 extending beneath the drop center floor section to a lever 38 shown in dotted lines on the transmission housing in Figure 1. The gear shifter lever 35 also has a transverse rocking motion which acts through a crank 39 shown in Figure 3 to rotate a shaft 40, the rear end of which has a crank 41 engaging a lever 42 on a cross shaft 43 in the transmission as indicated in dotted lines in Figure 1.

The clutch, brake and throttle controls are operated by handles 44 positioned adjacent each door, a cross shaft 45 connecting the two handles 44. This cross shaft is provided with a central crank or lever 46 having a rod 47 connected to a bell crank 48 which in turn operates a rod 49 extending to a lever 50 on the transmission. The shaft 51, on which the lever 50 is mounted, operates the engine clutch while an extension 52 of the lever has a link 53 connecting to a lever 54 operating a transmission brake 55 on the rear end of the transmission. This arrangement results in the use of the handles 44 to engage the clutch when pushed forward and to engage the brake when pulled back. A latching type foot brake pedal 74 is also connected by a lever 75 to the bell crank 48. The handles 44 are also mounted for rotary motion, a lever 56 on the lower ends thereof having a link 56a connecting to a wrist plate 57 which rotates a vertical shaft 58 which in turn acts on a rod 59 extending to a throttle lever 60 on the intake pipe 61 of the engine.

The body proper is carried by the front and rear brackets 15 and 28 which support the extensions of the body floor directly over the axles. A one piece channel shaped member 62 forms an upward continuation of the front bracket 15 and is securely fastened to a substantial one piece roof 63, a glass front panel or windshield 64 being mounted in front of the channel. A similar channel member 65 forms a continuation of the rear bracket 28 to support the roof above the rear axle, the roof and two channel members together with the floor forming a substantial truss wherein the roof takes a large share of the loads involved in maintaining the alignment and spacing of the axles.

The side panels 66 are positioned against the outer face of the rear channel member 65, the bottom of the panel resting in a channel 67 formed in the floor member and the beveled top of the panel engaging under the overhanging edges 68 of the roof. A sliding door 69 is fitted on each side of the body at the forward end of the drop center section, the door being mounted flush with the side panels when closed, in order to have the door properly sealed. To the door is mounted on roller hangers 70 which ride on a rod 71 the cranked ends 72 of which are permitted limited rotary movement in brackets 73. When the door is closed the rod assumes the position of Figure 7. By pulling or pushing the door towards the left of this figure, the rod shifts over top center, lifting the door out of the channel 67, and assumes the position of Figure 6 wherein the door hangs inside of and clear of the side panel so that it can be slid back alongside thereof. To close the door the process is reversed.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In an automotive vehicle, self contained front and rear axles, the rear axle including a power plant, a body directly attached to said axles, a substantial one piece roof for said body and body framing extending from said roof to the points of attachment of said axles whereby the body roof is adapted to form a truss for maintaining the alignment and spacing of said axles.

2. In an automotive vehicle, self contained front and rear axles, the rear axle including a power plant, a body directly attached to said axles, torque and radius connections from said axles to the body, a substantial one piece roof for said body and body framing extending from said roof to the points of attachment of said axles whereby the body roof is adapted to form a truss for maintaining the alignment and spacing of said axles.

3. In an automotive vehicle, self contained front and rear axles, a body directly attached to said axles, a substantial one piece roof for said body and body framing extending from said roof to the points of attachment of said axles whereby the body roof is adapted to form a truss for maintaining the alignment and spacing of said axles.

4. In an automotive vehicle, self contained front and rear axles, a body directly attached to said axles, torque and radius connections from said axles to the body, a substantial one piece roof for said body and body framing extending from said roof to the points of attachment of said axles whereby the body roof is adapted to form a truss for maintaining the alignment and spacing of said axles.

5. In an automotive vehicle, a substantially rigid body comprising a roof and floor connected by braces to form a deep truss, front and rear axles mounted beneath said body directly in line with said braces, and axle torque and brace connections extending to the body floor at a distance from said axles.

6. In an automotive vehicle, a substantially rigid body comprising a roof and floor connected by front and rear vertical members to form a deep truss, front and rear axles mounted beneath said body directly in line with said front and rear vertical members, and axle torque and brace connections extending to the body floor at a distance from said axles.

7. In an automotive vehicle, a substantially rigid body comprising a roof and a drop center floor connected by braces to form a deep truss, front and rear axles mounted beneath said body directly in line with said braces, and axle torque and brace connections extending to the drop center section of the floor.

8. In an automotive vehicle, a substantially rigid body comprising a roof and a drop center floor connected by front and rear vertical members to form a deep truss, front and rear axles mounted beneath said body directly in line with said front and rear vertical members, and axle torque and brace connections extending to the drop center section of the floor.

9. An automotive vehicle body comprising substantial roof and floor members, vertical braces connecting said roof and floor to form a truss, front and rear axle units mounted directly beneath said body and substantially horizontal tie members connecting said axle units to the body floor whereby the body truss is adapted to eliminate the usual chassis frame.

10. A body of the class described comprising floor and roof members, a truss-like framework connecting said floor and roof members, side panels secured to said framework, sliding doors mounted flush with said side panels, and shiftable supporting and guiding means for said doors adapted to lift and retract said doors to clear the framework when it is desired to open said doors.

11. A body of the class described comprising floor and roof members, a truss-like framework connecting said floor and roof members, side panels secured to said framework, sliding doors mounted flush with said side panels when in closed position, sliding door hangers therefor, and a shiftable track for said hangers adapted to move said door inwardly to clear the framework when it is desired to open said sliding doors.

12. An automotive body structure including vertical members defining an entrance thereto and connecting the roof and floor thereof, a door pocket formed in the floor at the entrance, side panels applied to said vertical members, a sliding door for said entrance seating in said door pocket and flush with said side panels when closed, and means for bodily lifting and shifting said door inwardly to clear said pocket and vertical members prior to opening said door.

13. An automotive body structure including vertical members defining an entrance thereto and connecting the roof and floor thereof, a door pocket formed in the floor at the entrance, side panels applied to said vertical members, a sliding door for said entrance seating in said door pocket and flush with said side panels when closed, sliding door hangers therefor, and a shiftable track for said hangers adapted to move said door upwardly and inwardly to clear said door pocket and vertical members prior to opening said doors.

In testimony whereof I have hereunto subscribed my name.

LEE OLDFIELD.